United States Patent
Hellstrom et al.

(10) Patent No.: US 10,804,565 B2
(45) Date of Patent: Oct. 13, 2020

(54) BATTERIES WITH POLYMER ELECTROLYTE COMPOSITES BASED ON TETRAHEDRAL ARYLBORATE NODES

(71) Applicants: Robert Bosch GmbH, Stuttgart (DE); The Regents of the University of California, Oakland, CA (US); Seeo, Inc., Hayward, CA (US)

(72) Inventors: Sondra Hellstrom, East Palo Alto, CA (US); David Abram, Sunnyvale, CA (US); Michael Aubrey, Berkeley, CA (US); Jeffrey Long, Oakland, CA (US); Katherine Harry, Oakland, CA (US); John F. Christensen, Elk Grove, CA (US); Hany Eitouni, Oakland, CA (US); Jordan Axelson, Champaign, IL (US)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 16/049,911

(22) Filed: Jul. 31, 2018

(65) Prior Publication Data
US 2019/0051938 A1    Feb. 14, 2019

Related U.S. Application Data

(60) Provisional application No. 62/539,207, filed on Jul. 31, 2017.

(51) Int. Cl.
*H01M 10/056* (2010.01)
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01); *H01M 2300/0091* (2013.01)

(58) Field of Classification Search
CPC .............. H01M 10/0565; H01M 10/0525
See application file for complete search history.

(56) References Cited

U.S. PATENT DOCUMENTS 9,219,271 B2 * 12/2015 Kolosnitsyn ............ H01M 4/13
9,960,447 B2 *  5/2018 Long ................ H01M 10/0565
(Continued)

FOREIGN PATENT DOCUMENTS

| JP | 2003092138 A | * | 3/2003 | |
| KR | 1020170053577 A | * | 10/2018 | ........ H01M 10/0565 |
| WO | 2016201335 A1 | | 12/2016 | |

OTHER PUBLICATIONS

Machine translation of KR 10-2017-0053577 (no date).*
(Continued)

*Primary Examiner* — Amanda C. Walke
(74) *Attorney, Agent, or Firm* — Maginot, Moore & Beck LLP

(57) ABSTRACT

Solid electrolytes have a favorable combination of properties such as high conductivity, high transference number, optimum processability, and low brittleness. A composite electrolyte includes some amount of a class of network polymer electrolytes with high transference number and high room temperature conductivity, and an additional polymeric component to contribute mechanical integrity and/or processability. The solid electrolytes can include a network polymer having linked nodes composed of a tetrahedral arylborate composition and a linear polymer combined with the network polymer as a composite. The solid electrolytes can be used in thin films and in solid-state batteries.

20 Claims, 1 Drawing Sheet

(56) References Cited

U.S. PATENT DOCUMENTS

| | | | |
|---|---|---|---|
| 2014/0106236 A1* | 4/2014 | Kwon | H01M 10/0565 |
| | | | 429/309 |
| 2014/0287305 A1* | 9/2014 | Wachsman | H01M 10/052 |
| | | | 429/211 |
| 2016/0049690 A1* | 2/2016 | Basak | H01G 9/2009 |
| | | | 429/309 |
| 2016/0315348 A1 | 10/2016 | Long et al. | |
| 2018/0166744 A1* | 6/2018 | Long | C08G 65/337 |
| 2019/0067757 A1* | 2/2019 | Kohlberger | H01M 10/633 |
| 2019/0135988 A1* | 5/2019 | Burdynska | H01M 4/5805 |
| 2019/0326578 A1* | 10/2019 | Frischmann | H01M 10/056 |

OTHER PUBLICATIONS

International Search Report and Written Opinion corresponding to International Patent Application No. PCT/US2018/044541 (12 pages).

Van Humbeck, J. F. et al., "Tetraarylborate polymer networks as a single-ion conducting solid electrolytes," Chemical Science, vol. 6, 5499-5505, 2015 (7 pages).

Zhang, Y. et al., "A class of sp3 boron-based single-ion polymeric electrolytes for lithium ion batteries," RSC Advances, vol. 3, 14934-14937, 2013 (4 pages).

Liang, S. et al., "Synthesis and Lithium Ion Conduction of Polysiloxane Single-Ion Conductors Containing Novel Weak-Binding Borates," Chemistry of Materials, vol. 24, 2316-2323, 2012 (8 pages).

* cited by examiner

BATTERIES WITH POLYMER ELECTROLYTE COMPOSITES BASED ON TETRAHEDRAL ARYLBORATE NODES

PRIORITY CLAIM AND CROSS-REFERENCE TO PRIOR APPLICATION

This application is a utility filing from and claims priority to U.S. Provisional Application No. 62/539,207, filed on Jul. 31, 2017, the entire disclosure of which is incorporated herein by reference.

BACKGROUND

Since its first commercial release in the 1990s, the lithium-ion (Li-ion) battery has steadily improved to the point where it has become a staple component in electronic products. In recent years, the Li-ion battery has fostered the development of affordable electric and hybrid vehicles. However, commercial grade Li-ion cells are reaching their maximum energy storage capability (~250 Wh/kg) and are still unable to provide a safe, low-cost battery with storage sufficient for electric vehicles with 100+ mile ranges. A new generation of batteries with energy densities of at least 400 Wh/kg, low cost (<$125/kWh), excellent safety, and low environmental impact is urgently needed.

Solid-state Li-ion cells have been recently developed that possess high energy densities (>400 Wh/kg) and very good safety properties. Up to now, one key factor inhibiting the commercialization of solid-state-cells is the lack of a suitable electrolyte. Existing candidate solid electrolytes have insufficient conductivities and low transference numbers (such as polymer electrolytes), poor processability and high boundary resistances (as in ceramic electrolytes), mechanical instability (as in gel based electrolytes) or severe chemical instabilities to air and water (as in electrolytes using sulfidic materials).

Blends or composites of multiple polymeric or oligomeric electrolytes have been investigated. However, these electrolytes have not gained wide acceptance primarily because different polymeric systems tend to have similar advantages and disadvantages thereby limiting the overall potential benefit of a blend. However, new classes of polymeric materials are emerging that possess properties similar to ceramics in many respects. These materials are single-ion conductors or nearly so, and have relatively high (>$10^{-5}$ S $cm^{-1}$) ionic conductivities at room temperature. Unlike ceramic solids, polymer/oligomer composites generally possess an open network that enables the composite electrolyte to take up liquids, plasticizers, or other compounds; indeed, some composites require these additional components to function. Along with this, the tunability and chemical structure of these polymers present an opportunity for distributed, high-surface area interfacial engineering.

Within the class of solid-state battery cells, it is desirable to use a polymer electrolyte to minimize (compared to ceramic electrolytes) the interfacial resistance between electrode materials and the electrolyte. Polymers tend to be more easily processed in air than ceramics and are more mechanically robust; their elasticity and lack of brittleness makes them ideal candidates for absorbing volume change. Polymers are also less dense than ceramics, thereby offering gains in specific energy. However, known Li-ion polymer electrolytes, such as polyethylene oxide (PEO), tend to have poor ionic conductivity at room temperature (<$10^{-5}$ S $cm^{-1}$). Moreover, conventional PEO electrolytes typically have low transference numbers (<0.3) at all temperatures of interest, which results in high concentration polarization and therefore low rate capability.

SUMMARY OF THE DISCLOSURE

There is a growing need for a commercially practical solid-state battery with improved storage capacity and safety. The present disclosure provides an electrolyte material containing, at least in part, a borate-based network polymer phase with a high transference number, and a polymeric phase which may conduct anions and/or cations, or which may serve only as a binder. This novel electrolyte material may also include one or more plasticizers. The resulting composite is a processable electrolyte with higher conductivity and higher transference number than would be achievable by conventional polymeric electrolytes (such as polyethylene oxide) alone. The electrolyte material disclosed herein represents a significant advance in the field of solid-state batteries.

The solid electrolyte materials disclosed herein provide high conductivity, high transference number, chemical stability, superior processability, and suitable mechanical properties. Use of these electrolytes will lead to increased rate capability as well as improved energy density by allowing thicker active material layers in polymeric solid-state batteries. In one aspect of the disclosure, a composite of multiple polymers is provided that includes at least one borate-based network polymer with a transference number $t_+>0.9$.

The present disclosure contemplates the formation of thin films having high-transference number (>0.9), high-conductivity (at least >$1\times10^{-5}$ S $cm^{-1}$ at room temperature and preferably >$1\times10^{-4}$ S $cm^{-1}$) network polymer electrolytes in all solid-state cells, either (or both) as the catholyte (i.e., electrolyte integrated into cathode) and/or as the separator material. As well as having most of the advantages of polymeric electrolytes in general, these polymer materials are readily processable in dry air or air which overcomes many of the manufacturing limitations of present solid-state Li-ion or Li battery cells that use sulfides (sensitive to moisture and air) or garnets (sensitive to $CO_2$). The polymer materials disclosed herein also have more reliable interfacial resistances as opposed to other known polymeric systems.

The present disclosure contemplates an electrolyte composite composed of at least: 1) a single-ion conducting network polymer having a transference number (or ion transfer number) $t_+>0.9$); and 2) a linear polymer which may or may not also be able to solvate metal cations such as $Li^+$. In one aspect, the single-ion conducting network polymer comprises of a system of tetrahedral arylborate nodes connected with linkers, and in particular tetrahedral perfluoroarylborate nodes.

DETAILED DESCRIPTION

Figure 1:
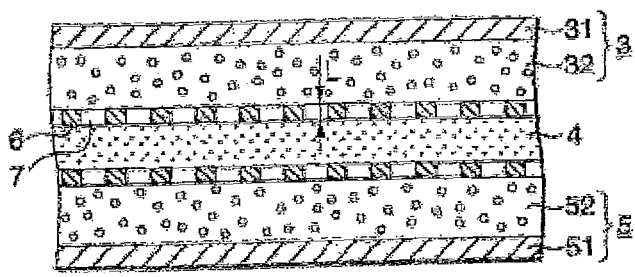
FIG. 1 is a schematic of a generalized solid-state battery for incorporating the composite electrolytes disclosed herein.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

The general structure of a solid-state battery, such as a lithium-ion battery, is shown in FIG. 1. The battery includes a cathode 3 formed by a positive current collector 31 and an active material layer 32 and an anode 5 formed by a negative current collector 51 and an active material layer 52. A separator 4 is interposed between the cathode and anode to physically separate the opposing electrodes while permitting ion transfer therebetween. An electrolyte 6 is also disposed between the cathode and anode and is configured to conduct ions therebetween. In some batteries, the separator 4 is provided with openings or voids 7 to contain the electrolyte.

An electrolyte composite is composed of at least: 1) a single-ion conducting network polymer ($t_+>0.9$) which may or may not also require a plasticizer; and 2) a linear polymer, which may or may not also be able to solvate metal cations such as $Li^+$. The electrolyte may also include conventional polymeric ionic conductors such as polyethylene oxide or polypropylene carbonate, salts such as lithium bis(trifluoromethane)sulfonimide (TFSI), and small molecule or oligomeric plasticizers such as propylene carbonate, ethylene carbonate, low-MW PEGs, tetraglyme, dimethyl sulfoxide, and the like.

Figure 2:
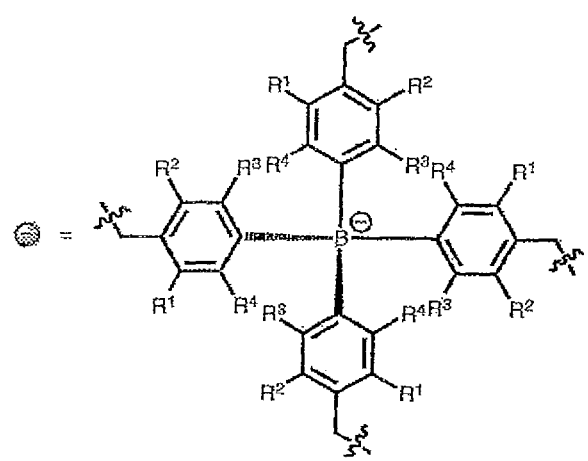
FIG. 2 shows the chemical structure of the tetrahedral perfluoroarylborate node according to one embodiment of the composite electrolytes disclosed herein.
Figure 3:
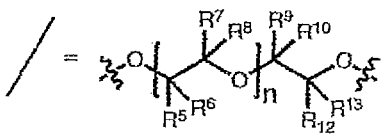
FIG. 3 shows the chemical structure of a poly(ethylene glycol) (PEG) linker for linking the tetrahedral perfluoroarylborate node according to one embodiment of the composite electrolytes disclosed herein.
Figure 4:
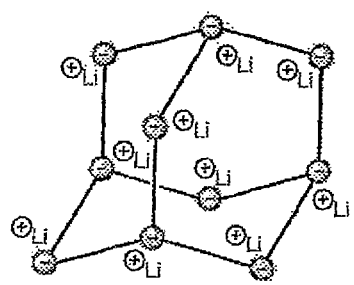
FIG. 4 shows part of the three-dimensional aperiodic connectivity between the borate node of FIG. 2 and the linker of FIG. 3.

The single-ion conducting network polymer comprises of a system of arylborate nodes connected with linkers. In one embodiment the nodes are tetrahedral arylborate nodes, and more specifically tetrahedral perfluoroarylborate nodes. The linkers may possess any suitable chemical structure with a topicity of two or higher, but example linkers include glycol, di- and tri-ethylene glycol, longer polyethylene glycols (PEG), 1,5-pentanediol, and linkers with structures as reported in the published application US2016/0315348 entitled "Polymer Network Single-Ion Conductors", published on Oct. 27, 2016 in the name of applicant The Regents of the University of California (the '348 Publication). A network polymer formed of tetrahedral perfluoroarylborate nodes and PEG linkers is another exemplary structure suitable for the composite electrolyte disclosed herein. Such a network polymer is disclosed in published Application US2018/0166744 entitled "Polymer Network Single-Ion Conductors with Flexible Linker", published on Jun. 14, 2018 in the name of The Regents of the University of California (the '744 Publication). The structure of the nodes is shown in FIG. 2, the linker in FIG. 3 and the combined three-dimensional structure in FIG. 4. This network polymer can be synthesized as disclosed in the '744 Publication. The disclosures of the '348 Publication and the '744 Publication are incorporated herein in their entirety.

The linear polymer component of the present electrolyte composite can be any linear polymer. This linear polymer may be, but is not necessarily, an ionic conductor, such as polyethylene oxide, polyethylene glycol, polyacrylonitrile, polypropylene, polypropylene carbonate or polycaprolactone or derivatives thereof. A suitable non-ionically conductive polymer may be polystyrene or polyvinylidene fluoride.

The present disclosure further contemplates batteries and battery components made with the class of composite electrolytes described above.

The fabrication of specific examples of electrolyte thin films is described herein, but it is understood that these descriptions do not limit the scope of the invention in any way. Small-grained borate-based network polymers may be prepared by bath ultrasonication in an appropriate solvent such as DMF (dimethylformamide) and subsequently dried.

In a first example, a well-mixed slurry of small-grained borate-based network polymer, PEO (polyethylene oxide), and LiTFSI (lithium bis(trifluoromethanesulfonyl)imide) may be prepared in a solvent such as NMP (N-methyl-2-pyrrolidone). This slurry may be cast onto a TEFLON® (Polytetrafluoroethylene (PTFE)) substrate by a doctor blade. It may subsequently be dried at 50° C. and re-solvated, or the solvent replaced with an appropriate plasticizer such as PEG500 (polyethylene glycol).

In a second example, a well-mixed slurry of small-grained borate-based network polymer and polystyrene may be prepared in a solvent such as NMP. This slurry may be cast onto a TEFLON® substrate by a doctor blade. It may subsequently be dried at 150° C. and re-solvated, or the solvent replaced with an appropriate plasticizer such as tetraglyme or propylene carbonate.

In a third example, a well-mixed slurry of small-grained borate-based network polymer and polypropylene may be prepared in a solvent such as o-xylene. This slurry may be cast onto a TEFLON® substrate by a doctor blade. It may subsequently be dried at 100° C. and re-solvated, or the solvent replaced with an appropriate plasticizer such as tetraglyme or propylene carbonate.

In each example, the resulting thin film electrolyte can be combined with conventional thin film electrode plates to form a battery. In each example, the small-grained borate-based network polymer is formed of the linked tetrahedral perfluoroarylborate nodes described above.

The present disclosure contemplates a solid-state electrolyte containing at least a network polymer with tetrahedral arylborate nodes, and a linear polymer. In certain aspects, the nodes are tetrahedral perfluoroarylborate nodes and the linear polymer is polystyrene or polyvinylidene fluoride (PVDF). In other aspects, the linear polymer is polyethylene oxide, polypropylene carbonate, polyacrylonitrile, or polycaprolactone. In a further feature, the network polymer includes linkers of glycol, di- and tri-ethylene glycol, longer polyethylene glycols, or 1,5-pentanediol. The composite electrolyte may be wetted with plasticizing agent(s) and/or include lithium salts suitable for use in a battery.

The present disclosure further contemplates a solid-state or gel battery comprising an electrolyte comprised of at least a network polymer with tetrahedral arylborate nodes, and a linear polymer. In certain aspects, the nodes are tetrahedral perfluoroarylborate nodes. In one aspect, the disclosed electrolyte composition is in the cathode, and in particular the cathode active material. In another aspect the electrolyte is contained within the separator. The battery can be constructed in accordance with known Li-ion batteries or in other subsequently developed forms.

The present disclosure should be considered as illustrative and not restrictive in character. It is understood that only certain embodiments have been presented and that all changes, modifications and further applications that come within the spirit of the disclosure are desired to be protected.

What is claimed is:

1. A solid-state electrolyte for a battery comprising:
   a network polymer having linked nodes composed of a tetrahedral arylborate composition; and
   a linear polymer combined with said network polymer as a composite.

2. The solid-state electrolyte of claim 1, wherein said tetrahedral arylborate composition is a tetrahedral perfluoroarylborate.

3. The solid-state electrolyte of claim 1, wherein the linear polymer is polystyrene or polyvinylidene fluoride.

4. The solid-state electrolyte of claim 1, wherein the linear polymer is selected from the group consisting of polyethylene oxide, polypropylene carbonate, polyacrylonitrile, and polycaprolactone.

5. The solid-state electrolyte of claim 1, wherein the network polymer includes linkers for linking the tetrahedral arylborate composition nodes, the linkers selected from the group consisting of glycol, di-ethylene glycol, tri-ethylene glycol, longer polyethylene glycols, and 1,5-pentanediol.

6. The solid-state electrolyte of claim 1, wherein the composite is wetted with one or more plasticizing agents.

7. The solid-state electrolyte of claim 1, wherein the composite includes lithium salts.

8. A solid-state or gel battery comprising:
   an anode;
   a cathode;
   a separator between said anode and said cathode; and
   a composite electrolyte comprising;
      a network polymer having linked nodes composed of a tetrahedral arylborate composition; and
      a linear polymer combined with said network polymer as a composite, wherein said composite electrolyte is in the separator.

9. The solid-state electrolyte of claim 8, wherein said tetrahedral arylborate composition is tetrahedral perfluoroarylborate.

10. The solid-state electrolyte of claim 8, wherein the linear polymer is polystyrene or polyvinylidene fluoride.

11. The solid-state electrolyte of claim 8, wherein the linear polymer is selected from the group consisting of polyethylene oxide, polypropylene carbonate, polyacrylonitrile, and polycaprolactone.

12. The solid-state electrolyte of claim 8, wherein the network polymer includes linkers for linking the tetrahedral arylborate composition nodes, the linkers selected from the group consisting of glycol, di-ethylene glycol, tri-ethylene glycol, longer polyethylene glycols, and 1,5-pentanediol.

13. The solid-state electrolyte of claim 8, wherein the composite is wetted with one or more plasticizing agents.

14. The solid-state electrolyte of claim 8, wherein the composite includes lithium salts.

15. A solid-state or gel battery comprising:
   an anode;
   a cathode; and
   a composite electrolyte comprising;
      a network polymer having linked nodes composed of a tetrahedral arylborate composition; and
      a linear polymer combined with said network polymer as a composite, wherein the composite electrolyte is in the cathode.

16. The solid-state electrolyte of claim 15, wherein said tetrahedral arylborate composition is tetrahedral perfluoroarylborate.

17. The solid-state electrolyte of claim 15, wherein the linear polymer is polystyrene or polyvinylidene fluoride.

18. The solid-state electrolyte of claim 15, wherein the linear polymer is selected from the group consisting of polyethylene oxide, polypropylene carbonate, polyacrylonitrile, and polycaprolactone.

19. The solid-state electrolyte of claim 15, wherein the network polymer includes linkers for linking the tetrahedral arylborate composition nodes, the linkers selected from the group consisting of glycol, di-ethylene glycol, tri-ethylene glycol, longer polyethylene glycols, and 1,5-pentanediol.

20. The solid-state electrolyte of claim 15, wherein the composite includes lithium salts.

* * * * *